Patented May 8, 1945

2,375,236

UNITED STATES PATENT OFFICE 2,375,236

ANTIKNOCK MOTOR FUEL

Pharis Miller, Elizabeth, N. J., assignor to Standard Oil Development Company, a corporation of Delaware No Drawing. Application August 30, 1941, Serial No. 409,015

19 Claims. (Cl. 44—67)

This invention relates to the art of improving anti-knock characteristics of a motor fuel for high-compression, spark-ignition engines by additives which are highly effective in very small amounts for suppressing knocking.

An object of this invention is to provide highly effective metal-containing anti-knock additives which have satisfactory solubility, volatility, and stability.

Iron- and nickel-carbonyls have been known to be very effective anti-knock agents, but they are known to be attacked and decomposed easily by heat, light, and moisture. Also, other metals have been found to possess knock suppressing effectiveness, but it has been difficult to determine metal-containing compounds that can be safely handled, that remain stably dissolved in the fuel, and can be properly carburetted with the fuel to furnish effective concentrations of the metal within the combustion zones of spark-fired internal combustion engines.

Stable complex compounds considered to be useful anti-knock agents in accordance with the present invention are characterized as follows: (1) they contain a metal constituent capable of suppressing fuel knock in a spark-ignition engine, (2) the metal constituent is bonded to one or more electro-negative atoms or radicals, such as a halogen or halogenoid; (3) the metal constituent is also linked in complete co-ordination to molecular groups, e. g., carbon monoxide, ammonia, amine, organic nitrogen base, or metal oxide molecules. A general formula representing these stable complex compounds is:

$$[X_x.M.(N)_n]$$

wherein M represents the central metal constituent, X is the electronegative constituent taken $x$ times to satisfy an ordinary valency of the metal, and $(N)_n$ represents molecules having a co-ordinate linkage to the metal, $n$ being the number of these molecules, which can exist independently as neutral molecules. The atoms and molecules inside the bracket are regarded as being entirely non-ionizable.

Metals known to be capable of forming stable complexes are mainly the heavy metals, i. e., metals having specific gravities greater than 4, which are capable of forming double salts, are mainly amphoteric, and have more than one valence. These heavy metals are in groups I, IV, VI, VII, and VIII of the periodic system, as, for example, copper, thorium, lead, chromium, manganese, iron, nickel, cobalt, rhodium, and related metals having similar complex-forming and knock-suppressing properties.

Complex compounds of the type desired for use as anti-knock agents may be formed readily from halide salts of the metals. The higher atomic weight halogens, such as bromine or iodine, or a halogenoid, such as a cyanide radical, may be used in place of chlorine.

Some of the stable complexes are made in the absence of water, and for others, traces of water or alcohol vapor are essential. Complexes may also be formed by combining the metal halides with an amine or with ammonia molecules followed by absorption of carbon monoxide.

The preferred stable complexes contain co-ordinated molecules having basic characteristics, in addition to the halogen or electronegative atoms and co-ordinated neutral carbon monoxide molecules. This type is exemplified by complexes containing an oxide of the metal, an ammonia ($NH_3$) group, an amine, or another type of nitrogen base, in addition to the halogen and carbon monoxide linked to the metal constituent.

The kinds of reactions which occur are illustrated by the formations of stable complexes of copper. Cupric iodide forms a stable co-ordination complex with an amine, as, for example:

$$[I_2Cu(NH_2CH_2CH_2NH_2)]$$

Or, a copper halide, e. g., cuprous chloride, is converted into an ammino copper halide, e. g., $CuCl \cdot NH_3$, which absorbs carbon monoxide to form stable complexes of the type:

$$[X_x \cdot Cu(CO)(N')_b]$$

wherein (CO) and (N') represent neutral molecular groups corresponding to $(N)_n$ in the general formula, (N') being base-forming molecules taken $b$ times, as, for example, in $$[ClCu(CO)(NH_3)]$$

In the preferred stable ammino halide complexes, the ammonia molecule may be replaced by amines or organic nitrogen bases, e. g., ethylene diamine, isobutylamine, pyridine, etc., and the number of molecules depends upon the co-ordination number of the central metal constituent, which is 4 for cupric copper and 6 for most of the other useful metals.

Metals having a co-ordination number of 6 in stable complexes, are illustrated by a series of compounds derived from ammino cobalt halides, in which cobalt in the cobaltic state appears to be more stable and in which base-forming (ammino) groups are partly replaced by carbon monoxide, as in [Br₃·Co(CO) (C₅H₅N)₂].

The described type of complexes are highly stable and have suitable solubility in gasoline. Such small concentrations as only about 0.1% by weight of these compounds dissolved in a gasoline fed to a spark-ignition engine increase the anti-knock value of the fuel by 3 to 6 octane numbers.

A stable complex halide containing carbon monoxide with an inorganic basic molecule is specifically illustrated by a complex of rhodium which is represented by the molecular compound formula $RhCl_2.RhO.3CO$, also, expressed as $$[Cl_2.Rh(CO)_3RhO]$$

This complex is obtained by passing CO over rhodium chloride. At 140° C., hydrated rhodium chloride, $RhCl_3.H_2O$, and CO form the characteristic red crystals of the complex which melt at 125° C., and are sublimed unchanged. It decomposes at 300° C. It is more stable to heat, water, and light for general handling than is $Ni(CO)_4$ or $Fe(CO)_5$. This complex is readily dissolved in xylol, 1 g. dissolving in 50 cc. of xylol without difficulty. The relatively low vapor pressure of the solid complex makes it less toxic and easier to keep than the simple metal carbonyls.

The following data are presented to show the effectiveness of the complex rhodium chloride compound dissolved in a gasoline motor fuel: A xylol solution of the complex rhodium chloride, $RhCl_2.RhO.3CO$, containing 1 g. of this compound in 50 cc. of xylol, was added to one liter of a 65 A. S. T. M. octane number gasoline reference fuel. This blend contained less than one gram of the complex in the reference fuel with 5% of the added xylene, and gave the following engine test results:

|  | Octane rating | |
|---|---|---|
|  | A. S. T. M. | C. F. R. research |
| Base blend (ref. fuel+5% xylene) | 66.0 | 70.1 |
| Base blend+1 g. [RhCl₂.RhO.3CO] | 69.5 | 75.0 |
| Increase in octane number | 3.5 | 4.9 |
| Blending value | 2,630 | 4,500 |

It is readily apparent that the number of stable complexes is quite extensive, even though at this stage in their development a relatively small number of them have been of practical significance. It is also to be noted that the metals involved in the complexes are known to have different individual tendencies, as, for example, copper and cobalt appear to be most capable of forming stable ammino halide complexes; iron has particular ability to form cyanide complexes; nickel to form complexes with glyoximes, etc. Also, the halogens and molecular groups vary in their effects on stabilizing the complexes, but as a general rule, the higher atomic weight halogens and progressive replacements of carbon monoxide by base-forming molecules tend to decrease photosensitivity of the complexes.

The preferred stable complexes are substantially insoluble in water, have low melting points, and volatilize without decomposition. As a general rule, the valency of the electro-negative (acido) radicals in these complexes are numerically equal to the normal valency of the central metal constituent, so that the complex is null-valent and inert.

The stable complex anti-knock agents herein described are to be blended with gasoline type fuels in concentrations of about 0.01% to about 0.5% by weight to obtain substantial increases in the octane numbers of the fuels.

As illustrated, the stable complex compounds of the type described are some of the most effective anti-knock agents that have been discovered. They are indicated to have particularly high research blending values, which are of chief importance for their effects under actual operating conditions. It is also indicated that these stable complexes are particularly useful in their high effectiveness with aromatic hydrocarbon fuel ingredients.

The stable complex anti-knock agents may be used singly or in mixtures. They may be used to supplement metallo-organic anti-knock agents. They may be added to a fuel with other fuel blending agents, such as gum fluxes, corrosion inhibitors, anti-oxidants, color stabilizers, thickeners, lubricants, etc. They may be used in various refined motor fuel products, including straight run gasoline, cracked gasoline, polymer gasoline, alkylate, and with various anti-knock fuel blending compounds, such as alcohols, esters, amines, branched ethers, and the like.

The present invention is not intended to be restricted to specific examples given for illustration, nor to any theory on the structure or mechanim of the complex compounds, but is intended to cover all modifications included within the spirit of the invention as defined in the appended claims.

I claim:

1. An anti-knock motor fuel comprising a gasoline fuel containing a small amount of a stable complex having the formula:

$$[X_xM(N')_n]$$

wherein M represents a central heavy metal constituent selected from groups I, IV, VI, VII and VIII of the periodic table, X is a halogen atom taken $x$ times to satisfy an ordinary valency of said metal constituent, and $(N')_n$ represents molecules selected from the group consisting of carbon monoxide, nitrogen bases and an oxide of the metal M having co-ordinate linkages to the metal constituent.

2. A fuel composition as described in claim 9, in which M represents an atom of a heavy metal selected from groups I, IV, VI, VII, and VIII of the periodic system.

3. A motor fuel comprising essentially a hydrocarbon motor fuel base stock containing an octane number-increasing amount of a complex having substantially the formula $RhCl_2.RhO.3CO$.

4. A motor fuel consisting essentially of gasoline containing at least about 0.1% of a complex having substantially the formula $RhCl_2.RhO.3CO$.

5. A motor fuel consisting essentially of gasoline containing at least about 0.1% of a complex having the general formula $Cl_xRh(CO)_y$ wherein $x$ represents a number of chlorine atoms satisfying an ordinary valency of rhodium and $y$ represents the number of carbon monoxide molecules having coordinate linkages to the rhodium atom formed by passing carbon monoxide over rhodium chloride and heating the product to 140° C. to form a stable complex melting at about 125° C. and sublimable without it.

6. A motor fuel comprising a major proportion of gasoline and a minor but octane number increasing amount of a reaction product complex of rhodium chloride and carbon monoxide having a composition corresponding to the formula $RhCl_2 \cdot RhO \cdot 3CO$.

7. A motor fuel comprising a major proportion of gasoline base stock and a small amount of a reaction product complex of a heavy metal halide with ammonia, followed by absorption of carbon monoxide, the ammonia and carbon monoxide in said reaction product being connected by coordinate linkages to the metal atom, said complex having the general formula $X_xM(CO)_y(NH_3)_n$ wherein M represents a central heavy metal constituent having knock suppressing properties, $X_x$ stands for halogen atoms which satisfy an ordinary valency of M, and $y$ and $n$ represent the number of carbon monoxide and ammonia molecules respectively having coordinate linkages to M.

8. A motor fuel comprising essentially a hydrocarbon motor fuel base stock and an octane number increasing amount of a complex having the general formula $X_xM(CO)_y(N')_n$ in which $X_x$ stands for halogen atoms which satisfy an ordinary valency of M a heavy metal, $y$ represents the number of molecules of carbon monoxide and $(N')_n$ represents molecules of an oxide of the metal M, said molecules of carbon monoxide and metal oxide being connected by coordinate linkages to M.

9. A motor fuel comprising a gasoline fuel containing in solution a small amount of a stable complex having the formula $X_xM(CO)_y(N')_n$ wherein M represents a central heavy metal constituent having knock suppressing properties, $X_x$ stands for halogen atoms which satisfy an ordinary valency of M, $y$ is the number of carbon monoxide molecules, and $N(N')_n$ represent nitrogen base molecules, said carbon monoxide and nitrogen base molecules having coordinate linkages to M.

10. A fuel for spark-ignition engines increased in anti-knock value by a small amount of a stable complex having the formula $X_xCu(CO)_y$ wherein $X_x$ stands for halogen atoms which satisfy an ordinary valency of copper, and $y$ represents the number of carbon monoxide molecules, said carbon monoxide molecules having coordinate linkages to the copper.

11. A fuel for spark-ignition engines increased in anti-knock value by small amounts of a stable complex having the formula $X_xCu(CO)_y(N')_n$ wherein $X_x$ stands for halogen atoms which satisfy an ordinary valency of the copper, $y$ represents the number of carbon monoxide molecules, $(N')_n$ represent base-forming molecules, said carbon monoxide and base-forming molecules having coordinate linkages to the copper.

12. A fuel according to claim 11 in which the base-forming molecule is ammonia.

13. A fuel for spark-ignition engines increased in anti-knock value by a small amount of a stable complex ammino copper chloride containing carbon monoxide, and having the formula $ClCu(CO)(NH_3)$, said CO and $NH_3$ having coordinate linkages to the Cu.

14. A spark-ignition engine fuel increased in anti-knock value by a small amount of a stable complex halide of rhodium containing carbon monoxide, having the formula $X_xRh(CO)_y$ wherein $X_x$ stands for halogen atoms which satisfy an ordinary valency of rhodium, and $y$ represents the number of carbon monoxide molecules, said carbon monoxide molecules having coordinate linkages to the rhodium.

15. A fuel for spark-ignition engines increased in anti-knock value by a small amount of a stable complex chloride of rhodium containing carbon monoxide and rhodium oxide, and having the formula $Cl_xRh(CO)_y(RhO)_n$ wherein $x$ represents the number of chlorine atoms which satisfy an ordinary valency of rhodium, and $y$ and $n$ represent the number of carbon monoxide and rhodium oxide molecules respectively, said molecules having coordinate linkages with the rhodium.

16. A spark-ignition engine fuel increased in anti-knock value by a small concentration of a stable complex cobalt halide containing carbon monoxide, and having the formula $X_xCo(CO)_y$ wherein $X_x$ stands for halogen atoms which satisfy an ordinary valency of cobalt, and $y$ represents the number of carbon monoxide molecules, said carbon monoxide molecules having coordinate linkages to the cobalt.

17. Motor fuel according to claim 1 in which the complex comprises carbon monoxide and an amine.

18. Motor fuel according to claim 1 in which the molecules linked to the metal M by coordinate linkages consist entirely of carbon monoxide.

19. A motor fuel containing a small amount of a reaction product complex of rhodium chloride and carbon monoxide having the formula $Cl_xRh(CO)_y$ in which $x$ represents a number of chlorine atoms satisfying an ordinary valency of rhodium, and $y$ represents the number of carbon monoxide molecules, said carbon monoxide molecules having coordinate linkages to the rhodium.

PHARIS MILLER.